United States Patent Office 3,816,526
Patented June 11, 1974

3,816,526
METHOD FOR PRODUCING HALOBENZOYL HALIDES
Anthony T. Jurewicz, Kendall Park, N.J., assignor to Mobil Oil Corporation
No Drawing. Filed Oct. 3, 1972, Ser. No. 294,750
Int. Cl. C07c 63/10
U.S. Cl. 260—544 M                         9 Claims

ABSTRACT OF THE DISCLOSURE

Halogenation of benzoyl halide in the presence of a ferric halide catalyst and a halogenated hydrocarbon solvent provide higher yields of the meta isomer of monohalogenated benzoyl halide.

CROSS REFERENCE TO RELATED APPLICATIONS

None.

BACKGROUND OF THE INVENTION

Field of the invention

This invention is concerned with a process of making meta-halobenzoyl halides in improved yield which are highly useful starting materials in the production of certain herbicides, i.e., halophenoxynitrobenzoates.

For example, the process of this invention can be utilized in making the halophenoxy benzoic acid herbicides disclosed by U.S. Pat. 3,652,645.

Description of the prior art

E. Hope and G. C. Reily reported in the Journal of the Chemical Society, vol. 121, pp. 2510, 1922 the catalytic halogenation of benzoyl halides. However, no solvents were used. Other methods that have been described in the prior art for the preparation of such halides generally start with materials that already contain nuclear halide. For example, the conversion of chlorobenzaldehyde to chlorobenzoyl chloride with carbon tetrachloride. In these processes the monohalogenated form produced contained meta-, ortho- and para-fractions.

Applicant, however, has discovered a means whereby the desired meta isomer of the mono-halogenated benzoyl halide is produced in higher yield than previously known to the art.

SUMMARY OF THE INVENTION

This invention provides, in a method for producing halobenzoyl halides having the following general structure:

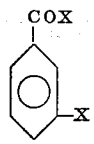

where X is chlorine, bromine, fluorine, iodine or combinations of said halides, the improvement wherein a benzoyl halide is halogenated in the presence of a ferric halide catalyst and a halogenated hydrocarbon solvent whereby greater yields of the desired meta isomer are obtained.

DESCRIPTION OF SPECIFIC EMBODIMENTS

This invention, therefore, provides a process for synthesizing halobenzoyl halides wherein the desired meta isomer of the mono-halogenated fraction of said halide is preferentially produced in high yield. Accordingly applicant's process produces yields of the desired meta isomer substantially higher than, to the best of his knowledge, is known to the prior art.

The invention is specifically directed toward the halogenation of a benzoyl halide in the presence of both an anhydrous ferric halide and a halogenated hydrocarbon solvent. The combination of the ferric halide catalyst and the halogenated hydrocarbon solvent results in a greater selectivity to the meta isomer of the monohalogenated benzoyl compound during the halogenation.

Non-limiting examples of compounds conveniently prepared according to this invention are: chlorobenzoyl chloride; chlorobenzoyl fluoride; fluorobenzoyl fluoride; bromobenzoyl bromide; iodobenzoyl iodide; chlorobenzoyl bromide; iodobenzoyl bromide and the like. Preferred are meta-chlorobenzoyl chloride and meta-chlorobenzoyl fluoride.

Non-limiting examples of halogenated hydrocarbon solvents used are the normally liquid materials such as carbon tetrachloride, carbon tetrafluoride, carbon tetrabromide and such di-, tri- or tetrahaloalkanes ($C_1$–$C_4$) as dichloromethane, dibromomethane, dichloroethane, tribromomethane, tetrachloroethane and the like. Chlorinated hydrocarbon solvents especially carbon tetrahalides, e.g., carbon tetrachloride, are preferred solvents.

The concentration of the benzoyl halide in the solvent can range from 1 to 99 percent by weight of the total composition, however, the meta content of the monohalogenated benzoyl halide increases with increasing dilution of the benzoyl compound.

The catalyst system used is a ferric halide or a combination of a halogen and a ferric halide. Non-limiting examples are, ferric chloride, ferric bromide, anhydrous ferric chloride, anhydrous ferric bromine, anhydrous ferric iodide, or a combination of iodine and anhydrous ferric chloride, etc. Anhydrous ferric halides are preferred to prevent possible conversion of the benzoyl halide to its acid form by the formation of water during the reaction. Especially advantageous is the combination of a halide and the anhydrous ferric halide. Use of this combination can result in a two to three fold reaction rate increase and a further improved meta isomer distribution in the monohalogenated fraction. The concentration of the catalyst can vary from about 0.1 to about 5% weight based on the amount of benzoyl halide present with the preferred range being from about 0.2 to 3 weight percent. However, when the catalytic combination of, for example, anhydrous ferric chloride and iodine are used, the preferred weight ratio is 10 to 50 within this concentration range.

The reaction temperature can vary within wide limits from about 0° C. to the boiling point of the solvent used under the reaction conditions employed. The preferred temperature, for example, when carbon tetrachloride is the solvent depends interalia on the catalyst system used. When anhydrous ferric chloride is used, the preferred temperature range is from about 30° to about 60° C. and when the anhydrous ferric chloride-iodine combination is used the preferred range is from about 5° to 40° C.

The rate of halogen addition to the reaction zone can also vary within wide limits depending upon the particular solvent used and solubility of the halogen in that particular solvent.

The process embodied herein can be carried out at atmospheric pressure, but any convenient or desired pressure may be used.

A review of prior art known to applicant reveals that the best overall yield of the monohalobenzoyl halide is approximately 76% with the isomer distribution of the monohalogenated fraction yielding about 83% of the meta fraction. Utilizing applicant's invention, over 80% of the benzoylhalide can be converted to the monohalogenated form with up to 95% of said monohalogenated fraction being meta.

The following detailed examples are intended as illustrations rather than limitations on the scope of this invention so as to provide a better understanding of the nature, objects and advantages of the invention.

EXAMPLE 1

To a three neck flask 100 ml. of carbon tetrachloride, 1.1 gms. of anhydrous ferric chloride ad 70 gms. of benzoyl chloride were charged. Chlorine was bubbled through the solution of 100 ml./min. After 330 minutes at 30° C., 85% of the benzoyl chloride was chlorinated, 80% was monochlorinated and 5% dichlorinated. The monochlorinated material was 6.5% ortho, 91.5% meta and 2% para. The chlorinated materials, as also in the following examples, were identified by standard gas chromatography techniques.

EXAMPLE 2

Under conditions identical to Example 1, for comparison, a run without a solvent was used. After 360 minutes, 87% of the benzoyl chloride was converted to 78% monochlorobenzoyl chloride and 9% dichlorobenzoyl chloride. The isomer distribution of the monochlorinated material was 15% ortho, 83% meta, and 2% para. It is readily apparent from the comparison of Examples 1 and 2 that almost a 10% improvement is obtained in Example 1 where a halogenated hydrocarbon solvent is used.

EXAMPLE 3

To a three neck flask 100 ml. of carbon tetrachloride, 1.1 gms. of anhydrous ferric chloride, 0.1 gm. iodine and 70 gms. of benzoyl chloride were added. Chlorine was bubbled through the solution at 100 ml./min. After 150 minutes at 10° C., 70.5% monochlorinated and 9% dichlorinated benzoyl chloride were obtained. The isomer ratio of the monochlorinated fraction was 3% ortho, 95% meta and 2% para.

EXAMPLE 4

To a three neck flask 100 ml. of dichloroethane, 1.1 g. of anhydrous ferric chloride and 7 g. of benzoyl chloride were charged. Chlorine was bubbled through the solution at 100 ml./min. After 370 minutes at 35° C., 63% monochlorinated and 2% dichlorinated benzoyl chloride were obtained. The isomer ratio of the monochlorinated form was 12% ortho, 86% meta and 2% para.

EXAMPLE 5

For comparison, a run identical to that of Example 1 was made except that 100 ml. of a non-halogenated solvent (octane) was used. After 360 minutes 26% monochlorinated benzoyl chloride was obtained. The isomer ratio was 18% ortho, 79% meta and 3% para. This example clearly demonstrates the advantages of using a halogenated hydrocarbon solvent to obtain the desired meta isomer.

In general the examples clearly demonstrate the advantages of using applicant's ferric halide-halogenated solvent system to obtain greater yields of the meta-isomer of a monohalogenated benzoyl halide.

Although the present invention has been particularly described with respect to preferred embodiments, all the disclosed embodiments and modifications apparent to one of ordinary skill in the art are considered to be within the scope of this invention.

What is claimed is:

1. In a method for producing a halobenzoyl halide having the following general structure:

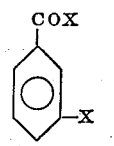

wherein X is chlorine, bromine, fluorine, iodine or combinations of said halides, the improvement wherein benzoyl halide is halogenated in the presence of a halogen, an anhydrous ferric halide catalyst and a di-, tri- or tetrahaloalkane ($C_1$–$C_4$) halogenated hydrocarbon solvent.

2. The method of claim 1 where X is chlorine and the halobenzoyl halide is meta-chlorobenzoyl chloride.

3. The method of claim 1 where the catalyst is selected from anhydrous ferric chloride, or anhydrous ferric chloride in combination with iodine.

4. The method of claim 3 where the catalyst system is iodine and anhydrous ferric chloride.

5. The method of claim 4 where the halogenation is carried out at a temperature of from about 5° to about 40° C.

6. The method of claim 1 where the solvent is a chlorinated solvent.

7. The method of claim 6 where the solvent is carbon tetrachloride.

8. The method of claim 1 wherein the concentration of the catalyst is from about 0.1 to about 5% weight based on the amount of benzoyl halide present.

9. In a method for producing meta-chlorobenozyl chloride, the improvement wherein benzoyl chloride is chlorinated in the presence of chlorine, an anhydrous ferric chloride-iodine catalyst with carbon tetrachloride as the solvent.

References Cited
UNITED STATES PATENTS 2,890,243  6/1959  Brown et al. _____ 260—544 M
3,014,965  12/1961 Newcomer et al. ___ 260—544 F
3,096,367  7/1963  Newcomer et al. __ 260—544 M LORRAINE A. WEINBERGER, Primary Examiner
R. D. KELLY, Assistant Examiner U.S. Cl. X.R.
260—544 F